United States Patent [19]
Mitsumata et al.

[11] Patent Number: 5,576,912
[45] Date of Patent: Nov. 19, 1996

[54] FLOATING MAGNETIC HEAD WITH REDUCED MAGNETOSTRICTION VIBRATION NOISE

[75] Inventors: Chiharu Mitsumata, Gunma-ken; Masanobu Yamazaki; Ryo Goto, both of Mooka, all of Japan

[73] Assignee: Hitachi Metals Limited, Tokyo, Japan

[21] Appl. No.: 240,813

[22] Filed: May 11, 1994

Related U.S. Application Data

[63] Continuation of Ser. No. 963,728, Oct. 20, 1992, abandoned.

[30] Foreign Application Priority Data

Oct. 22, 1991 [JP] Japan ................... 3-273636

[51] Int. Cl.$^6$ ............................................. G11B 5/60
[52] U.S. Cl. ................... 360/103; 360/122; 360/125; 360/126; 360/127; 428/692; 428/900; 252/62.56
[58] Field of Search ............. 360/103, 125, 360/126, 127, 122; 428/692, 694 R, 900; 252/62.54, 62.56

[56] References Cited

U.S. PATENT DOCUMENTS

| | | | |
|---|---|---|---|
| 3,837,910 | 9/1974 | Van der Laan et al. | 252/62.58 |
| 4,787,004 | 11/1988 | Akiho et al. | 360/127 |

FOREIGN PATENT DOCUMENTS 57-55522  4/1982  Japan .

OTHER PUBLICATIONS

Aso "Mechanically Induced Anisotropy and its Effect on Magnetic Permeability in Single Crystal Ferrites" IEEE Trans. Mag., vol. Mag. 14(2); Mar. 1978 pp. 76–81.

*Primary Examiner*—Stevan A. Resan
*Attorney, Agent, or Firm*—Staas & Halsey

[57] ABSTRACT

In a floating magnetic head, noises produced at the time of reproduction are reduced, thereby enhancing the precision of detection of a track position. The floating magnetic head uses a monocrystal magnetic material constituting an electromagnetic transducer element, and a crystal orientation of the monocrystal magnetic material in the electromagnetic transducer element is parallel to a direction of travel of a medium. In the case of $|\lambda_{111}|+2\times 10^{-6} \leq |\lambda_{100}|$, the crystal orientation is in the range of a solid angle of $3 \cdot \sin\theta \cdot \cos\phi$ which satisfies $0 \leq \theta < 10$ degrees and $0 \leq \phi \leq 360$ degrees around [111], and in the case of $|\lambda_{111}| \geq |\lambda_{100}|+2\times 10^{-6}$, the crystal orientation is in the range of a solid angle of $\sin\theta \cdot \cos\phi$ which satisfies $0 \leq \theta < 10$ degrees and $0 \leq \phi \leq 360$ degrees around [100], where $\lambda_{111}$ and $\lambda_{100}$ respectively represent linear magnetostriction constant of the monocrystal magnetic material in directions <111> and <100>. The monocrystal magnetic material is a monocrystal MnZn ferrite whose chemical composition is represented by $20 \leq MnO \leq 40$, $10 \leq ZnO \leq 25$, $50 \leq Fe_2O_3 \leq 65$ in terms of mol. %.

2 Claims, 13 Drawing Sheets

101 (111)

102 (100)

A CASE OF $|\lambda_{111}| + 2 \times 10^{-6} \leq |\lambda_{100}|$

A CASE OF $|\lambda_{111}| \geq |\lambda_{100}| + 2 \times 10^{-6}$

CRYSTAL ORIENTATION

CRYSTAL ORIENTATION

SINGLE CRYSTAL FERRITE MAGNETOSTRICTION
$$\lambda_{100} = -8.5 \times 10^{-6}$$
$$\lambda_{111} = +6.2 \times 10^{-6}$$

FLOATING MAGNETIC HEAD WITH REDUCED MAGNETOSTRICTION VIBRATION NOISE

This application is a continuation of application Ser. No. 07/963,728, filed Oct. 20, 1992, now abandoned.

BACKGROUND OF THE INVENTION

This invention relates to a floating (flying) magnetic head for a magnetic recording device used in a computer or the like which magnetic head converts magnetic signals into electric signals and vice versa to input and output the signals.

In order to achieve a high-density recording, various techniques have been introduced into magnetic recording devices serving as an external memory device. Magnetic heads used in the magnetic recording device have also been required to have a high performance to achieve high-density recording and reproduction. In order to meet the high-density recording requirement, an electromagnetic transducer element serving to effect the recording and reproduction has been constructed to have a narrow track design.

In the case of an advanced form of such narrow track design, the element is required to have electromagnetic transduction characteristics of high efficiency, and in order to enhance this transduction efficiency, the material for the element has been formed into a monocrystal structure. A typical example of such monocrystal material used as the electromagnetic transducer element is MnZn ferrite.

To determine the high performance of the element, a change in permeability has been discussed with respect to the relation between anisotropy energy and magnetostriction of a magnetic material, for example, by Magate et al (Technical Research Report 83 (1983) 11 by Institute of Electronics and Communication Engineers of Japan). Namely, the material of a high permeability is needed for the electromagnetic transducer element of a high efficiency.

The magnetostriction phenomenon of monocrystal materials has been discussed, for example, by Aso et al (IEEE Transactions on Magnetics 14 (1978) 76). According to the results of this discussion, the permeability of the monocrystal material is represented as a function of the magnetostriction through the induced magnetic anisotropy; however, attention is directed not to the values of the linear magnetostrictions possessed respectively by the individual materials, but to the effect of the saturation magnetostriction, and any detailed analysis of the linear magnetostriction constant with respect to the crystal orientation is not made.

One example of electromagnetic transducer element using such a monocrystal magnetic material is disclosed in Japanese Patent Unexamined Publication No. 57-55522. The greatest advantage of using the monocrystal material in the electromagnetic transducer element is that a high reproduction output can be obtained. Based on the results of the above discussions by Nagata et al and Aso et al, by controlling the value of the magnetostriction, the induced magnetic anisotropy energy is kept to within a predetermined range to cause the monocrystal magnetic material to have a high permeability, and further in the above techniques, by selecting a specified crystal orientation, the induced magnetic anisotropy energy is effectively controlled to successfully achieve the magnetic head of a high performance.

In the above techniques, it is necessary to control the magnetic anisotropy in order to obtain the element of a high conversion efficiency, and the magnetostriction phenomenon causing the induced magnetic anisotropy is utilized for this purpose. The selection of the crystal orientation of the monocrystal material is utilized as means for controlling the induced magnetic anisotropy in accordance with a change in the magnetostriction.

However, the magnetostriction phenomenon not only changes the magnetic characteristics of the magnetic material, but also causes a dynamic change with respect to the shape and etc., of the material. And besides, with a higher-density magnetic recording, technical problems which are inherent to the floating magnetic head and which have not so far been considered have arisen.

A floating magnetic head, used in an external magnetic recording device for a computer, effects the recording and reproduction by means of a single electromagnetic transducer element. Therefore, at the time of recording of signals, large electric current flows through an induction coil for exciting the element to greatly change the magnetization condition within the element, and the magnetic material whose magnetostriction is not zero is changed in shape due to a change in the magnetization condition of the interior of the magnetic material.

As a result, the element repeatedly expands and contracts in accordance with the change in the recording current, and therefore vibrates. On the other hand, in order to determine a track position for effecting the recording and reproduction, the magnetic head need to have information on the track position of the recording medium, and in order to achieve this, the magnetic head need to instantaneously effect the reproduction of a track servo signal. However, even after the signal is switched, the above vibration in the process of attenuation still remains, and when both the recording of signal and the track position change are effected successively, many and large noises are produced in the reproduction signal under the influence of the above vibration.

Such noises adversely affect the reproduction of the track position signal, and this results in a problem that the magnetic head fails to properly operate. This problem is conspicuous in the magnetic head using the monocrystal magnetic material for the electromagnetic transducer element.

The monocrystal has a high crystalline order, and therefore has a good nature, and is used as a high-performance material in various fields such as mechanical, magnetic and optical fields. The high crystalline order is determined by the degree of symmetry of the unit lattices constituting the whole of the crystal material, and the monocrystal has a low degree of symmetry, and is anisotropic. The anisotropy of the monocrystal may be an important factor in enhancing the performance, depending on its application or use; however, since other properties are also anisotropic, it is difficult to control them. It is thought that the vibration of the magnetic head which must be dealt with is caused by the anisotropy of the magnetostriction of the monocrystal.

In order to overcome the above problems, it can be considered to use an isotropic polycrystal magnetic material with a low crystalline order for the element. However, when the narrower-tack and higher-frequency design is adopted to achieve a high-density recording, the reproduction output is insufficient in the case of the polycrystal material, and besides noises are produced because of the low crystalline order. Therefore, the use of the monocrystal material is needed. Therefore, the technical problem to be solved is to reduce the vibration as much as possible.

SUMMARY OF THE INVENTION

It is an object of this invention to provide a floating magnetic head in which noises due to magnetostriction vibration are reduced.

According to the present invention, there is provided a floating magnetic head comprising an electromagnetic transducer element adapted to cooperate with a magnetic medium travelling with a slight gap above or below said transducer, said transducer element being made of a monocrystal magnetic material, said monocrystal magnetic material being provided with a crystal orientation so that, with respect to direction of the travel of the magnetic medium, (a) the axis of <111> of the monocrystal magnetic material is disposed in the range of a solid angle of $3 \cdot \sin\theta \cdot \cos\phi$ in which $\theta$ and $\phi$ meet the relations of $0 \leq \theta \leq 10$ degrees and $0 \leq \phi \leq 360$ degrees in a case of $|\lambda_{111}| + 2 \times 10^6 \leq |\lambda_{100}|$, and (b) the axis of <100> of the monocrystal magnetic material is disposed in the range of a solid angle of $\sin\theta \cdot \cos\phi$ in which $\theta$ and $\phi$ meet the relations of $0 \leq \theta < 10$ degrees and $0 \leq \phi \leq 360$ degrees in a case of $|\lambda_{111}| \geq |\lambda_{100}| + 2 \times 10^{-6}$, where $\lambda_{111}$ and $\lambda_{100}$ represent linear magnetostriction constants of said monocrystal magnetic material in the directions of <111> and <100>, respectively.

The definition of the solid angle is shown in FIG. 2. The solid angle defines an aggregation of vectors having start points at the center of a sphere with a radius $r$ and end points at a spherical surface of the sphere, and a curved surface occupied by the end points of the vectors defines the vectors in the range of a predetermined angle. If the polar angle and the rotation angle are represented by $\theta$ and $\phi$, respectively, the coordinates of a point on a unit sphere with a radius of 1 is represented by $(\theta, \phi)$ in terms of the polar coordinates, and is also represented by $(\sin\theta\cos\phi, \sin\theta\sin\phi, \cos\theta)$ in terms of the Cartesian coordinates. In this case, the aggregation of the points on the unit sphere (that is, the surface) can be represented by an expression giving its area.

In other cases than the unit sphere, $\theta\phi$ is approximated to $\sin\theta\cos\phi$ in terms of the Cartesian coordinates. In other cases than the unit sphere, $r^2\theta\phi$, that is, $r^2\sin\theta\cos\phi$, is obtained.

In the definition of the present invention, if the central vector is <100>, $\|<100>\|=1$ is provided, and this is an expression using the unit sphere, and if the central vector is <111>, $r^2=3$ is provided because of $\|<111>\|>=\sqrt{3}$, the solid angle is $3\sin\theta\cos\phi$. In general, regarding a vector <hkl>, if the length thereof is defined by the inner product thereof, there is expressed the following equation:

$$<hkl> \cdot <hkl> = <hkl>^2 = h^2 + k^2 + l^2$$

Thus, $L = (<hkl> \cdot <hkl>)^{1/2} = (h^2 + k^2 + l^2)^{1/2}$. In general, in a case of a vector $\underline{r}$, the square root of the inner product of the vector $r$ is called to be "norm" which is expressed as "$\|\underline{r}\|$". Thus, the length of the vector $<hkl>$ is $L = \|<hkl>\| = (h^2 + k^2 + l^2)^{1/2}$. Further, the inner product of the vectors, $\underline{r} = <r_1 r_2 r_3>$ and $<r_1' r_2' r_3'>$, is defined by $\underline{rr'} = r_1'r_1 + r_2'r_2 + r_3'r_3$.

In the floating magnetic head according to the present invention, the monocrystal magnetic material constituting the electromagnetic transducer element is a monocrystal MnZn ferrite whose chemical composition is represented by $20 \leq MnO \leq 40$, $10 \leq ZnO \leq 25$ and $50 \leq Fe_2O_3 \leq 65$ in terms of mol. %.

Although the vibration of the electromagnetic transducer element due to its expansion and contraction varies in amplitude depending on the crystal orientation of the monocrystal magnetic material, this element vibrates in all directions. That vibration mode among these which contributes to vibration noises deforms an induction coil wound on the element. In order to decrease the induced current by the deformation of the coil, it is necessary to decrease the vibration in the direction of the cross-section of the coil.

FIG. 1 is a general view showing the electromagnetic transducer element. In a floating magnetic head, the width 11 of the element is large relative to the thickness 12 of the element in order to achieve a high-density recording. The deformation of the magnetic material due to the magnetostriction is proportional to the length in the direction of the strain, and therefore the deformation of the coil due to the vibration increases in the direction of the width 11.

The electromotive force due to the electromagnetic induction is proportional to a change in magnetic flux passing through the coil; however, with respect to the electromotive force due to the deformation of the coil, the larger the deformation amount is, the larger the electromotive force is. This indicates that it is necessary to decrease the component of the vibration of the electromagnetic transducer element directed parallel to the direction of travel of the medium.

The magnetostriction vibration of a magnetic material depends on the value of the magnetostriction constant possessed by the magnetic material. Particularly in the case of monocrystal magnetic materials, the magnetostriction constant differs depending on the crystal orientation, and therefore the amplitude of the vibration is determined by the crystal orientation. The amplitude can be decreased by decreasing the magnetostriction constant; however, those of the monocrystal magnetic materials which satisfy $\lambda_{111}=0$ and $\lambda_{100}=0$ at the same time (where $\lambda_{111}$ and $\lambda_{100}$ represent the linear magnetostriction constants defined by the crystal orientation) are very rare, and therefore it is difficult to eliminate the vibration. However, even if $\lambda_{111}=\lambda_{100}=0$ is not satisfied, it is possible to control the amplitude by optimizing the crystal orientation. In the present invention, in accordance with the relative magnitude between the linear magnetostrictions $\lambda_{111}$ and $\lambda_{100}$ of the monocrystal magnetic material, that range of the crystal orientation which decreases the amplitude is selected to thereby solve the vibration noise problem.

In the floating magnetic head according to the present invention, the monocrystal magnetic material constituting the electromagnetic transducer element is a monocrystal MnZn ferrite whose chemical composition is represented by $20 \leq MnO \leq 40$, $10 \leq ZnO \leq 25$ and $50 \leq Fe_2O_3 \leq 65$ in terms of mol. %.

In a magnetic head, in order to effect a high-frequency recording and reproduction, it is necessary to keep a magnetic loss to a small level, and particularly in order to reduce eddy current loss at high frequency, MnZn ferrite which is an oxide having a high electrical resistivity is used as an electromagnetic transducer element material. The electromagnetic transducer element is required to produce a high output when a signal reproduction is effected, and therefore the element material need to have a high permeability. The monocrystal MnZn ferrite whose composition is in the range defined in the present invention has a small coercive force, and the permeability $\mu$ at 5 MHz is not less than 300 ($\mu \geq 300$). When the composition of the monocrystal MnZn ferrite is in the above range, the practical performance can be maintained even if the permeability is decreased by stresses caused by a glass joining operation and etc., during the manufacture of the magnetic head.

FIG. 3 is a diagram which shows the linear magnetostrictions $\lambda_{111}$ and $\lambda_{100}$ measured with respect to monocrystal MnZn ferrites, and also shows the crystal orientation which minimizes the amplitude of vibration due to these magnetostrictions. Reference numeral 31 represents a region in which the orientation which minimizes the vibration in the case of $|\lambda_{111}| + 2 \times 10^{-6} \leq |\lambda_{100}|$ is in a direction <100>, and reference numeral 32 represents a region in which the orientation which minimizes the vibration in the case of $|\lambda_{111}| \geq |\lambda_{100}| + 2 \times 10^{-6}$ is in a direction <100>. As appreciated from the values of the linear magnetostrictions shown in FIG. 3, also in the case of the monocrystal MnZn ferrite, there does not exist any composition which satisfies $\lambda_{111} = \lambda_{100} = 0$, and since the absolute values of $\lambda_{111}$ and $\lambda_{100}$ are large, the vibration noise can be suppressed to a low level by setting the crystal orientation of the monocrystal MnZn ferrite (which is used as the material of the electromagnetic transducer element) in such a direction as to minimize the vibration, using the above method.

In summation, the present invention provides an electromagnetic transducer element for a floating magnetic head. The transducer element is made of a magnetic monocrystal MnZn ferrite material. Moreover, the monocrystal MnZn ferrite material is provided with a crystal orientation so that, with respect to a direction of travel of the magnetic medium, (a) the <111> axis of the monocrystal MnZn ferrite material is a vector extending through the center of a unit sphere and a first solid angle thereof where $0 \leq \theta < 10$ degrees and $0 \leq \phi \leq 360$ degrees in a case of $|\lambda_{111}| + 2 \times 10^{-6} \leq |\lambda_{100}|$, and (b) the <100> axis of the monocrystal MnZn ferrite material is a vector extending through the center of the unit sphere and a second solid angle thereof where $0 \leq \theta < 10$ degrees and $0 \leq \phi \leq 360$ degrees in a case of $|\lambda_{111}| \geq |\lambda_{100}| + 2 \times 10^{-6}$. In the foregoing relationships, $\lambda_{111}$ and $\lambda_{100}$ represent linear magnetostriction constants of said monocrystal magnetic material in the <111> and <100> directions, respectively, and $\theta$ is the polar angle and $\phi$ is the rotation angle of said the angle.

DESCRIPTION OF THE PREFERRED EMBODIMENTS

Figure 1:
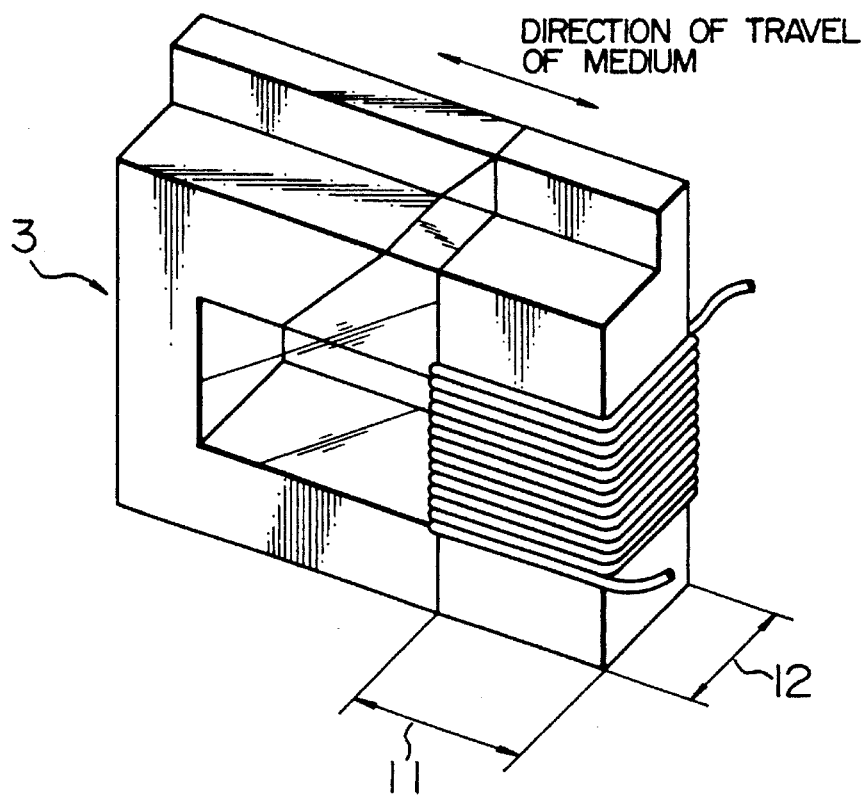
FIG. 1 is a general view showing an electromagnetic transducer element.
Figure 2:
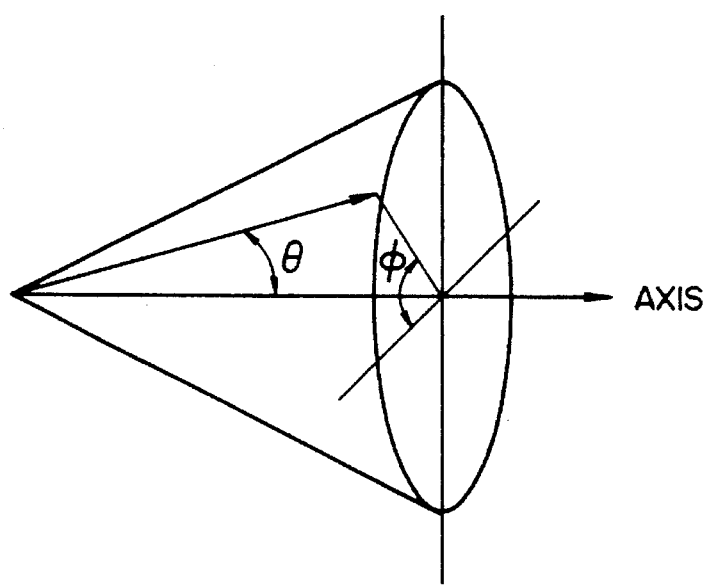
FIG. 2 is a view showing the definition of a solid angle.
Figure 3:
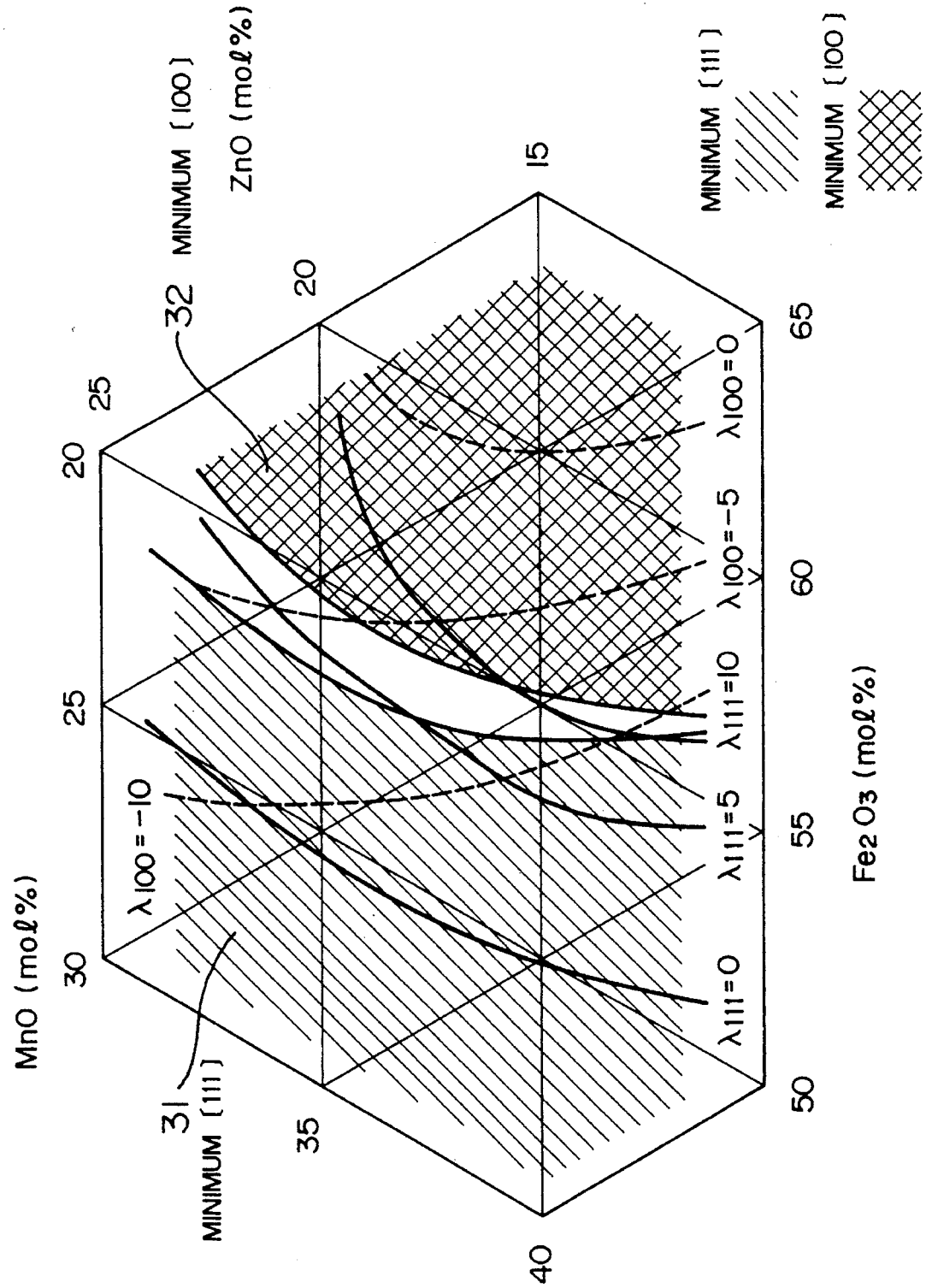
FIG. 3 is a diagram showing the dependency of a crystal orientation (which exhibits the minimum amplitude) on a magnetostriction with respect to a monocrystal MnZn ferrite.

One embodiment of a floating magnetic head of the present invention is shown in FIG. 9, in which the reference numeral 1 denotes a non-magnetic slider, 2 being a slit portion provided on one of the side rails of the slider, and 3 denotes a magnetic core to be embedded in the slit portion 2 which magnetic core comprises a C-shaped core piece 4 and an I-shape core piece 6 both of which are bonded to each other by glass 7 and each of which is made of a monocrystal (that is, single crystal) ferrite. As the first glass for bonding the pair of the magnetic core pieces, it is perferable to use, depending on the material of the magnetic core pieces, a glass having a softening point of 560° to 600° C. and a bonding temperature of 450° to 490° C. and having a thermal expansion coefficient of $93 \times 10^{-7}$ to $111 \times 10^{-7}/°$ C. in a temperature range from 30° C. to the bonding temperature. As regards another glass for bonding the magnetic core in the slit formed into a slider, there may be used, depending on the composition of the first glass and the material of the slider, a glass material having a softening point of 420° to 470° C. and a thermal expansion coefficient of $82 \times 10^{-7}$ to $100 \times 10^{-7} °$ C. in a temperature range from 30° to 280° C.

In the magnetic core 3, the crystal orientation thereof is disposed within the range of $\theta = \pm 10°$ with respect to <111>, depending on the value of magnetostriction of the magnetic body constituting the core. Thus, by inserting the magnetic core in the slider and by glass-bonding it, it is possible to reduce the amplitude of the vibration of a magnetic core which is the source of vibration to thereby make it possible to reduce vibration propagating to the slider. As the result, vibration noise due to the sympathetic vibrations of the slider can be minimized.

Figure 12A:
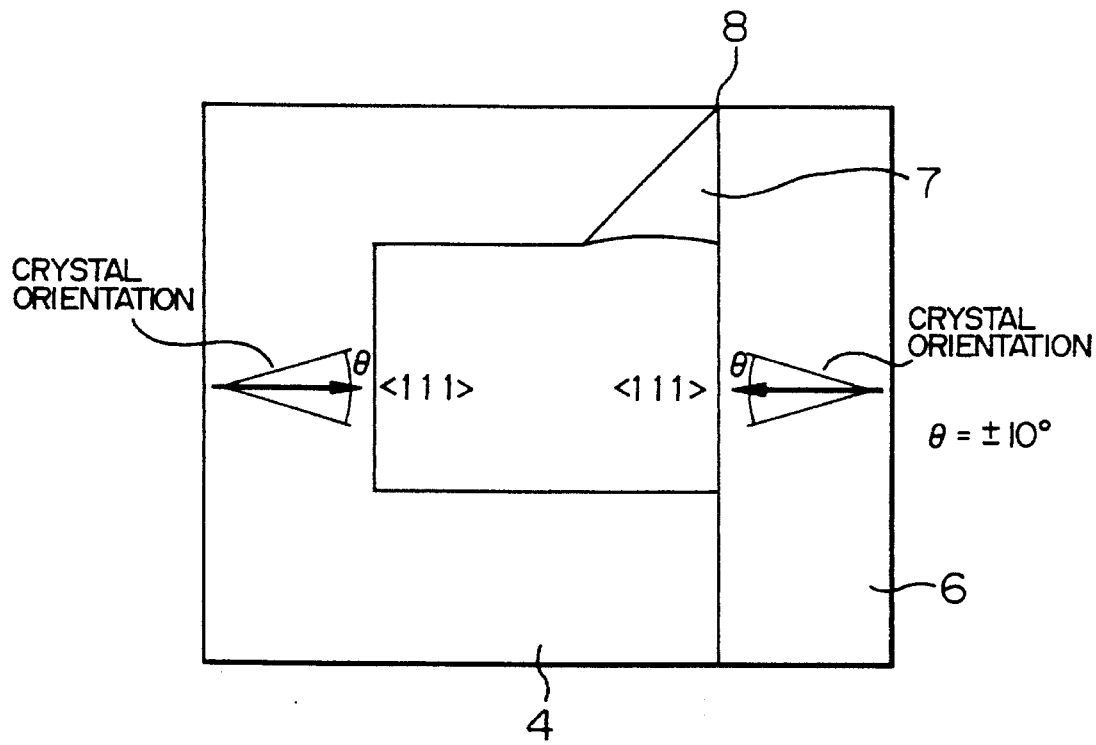
FIGS. 12A to 12F are views showing the crystal orientation of the magnetic core.
Figure 12B:
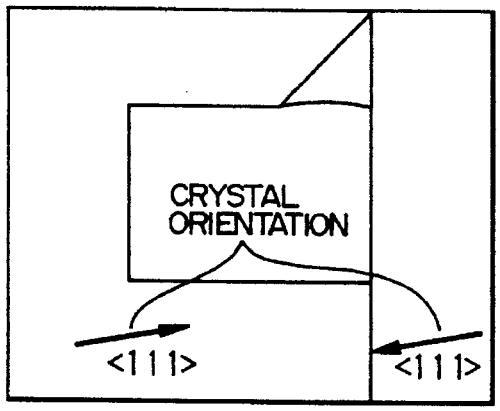
Figure 12C:
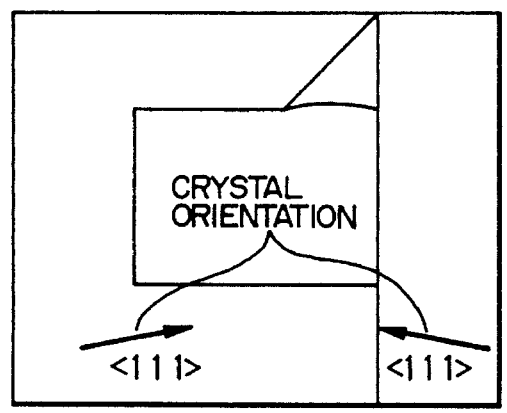
Figure 12D:
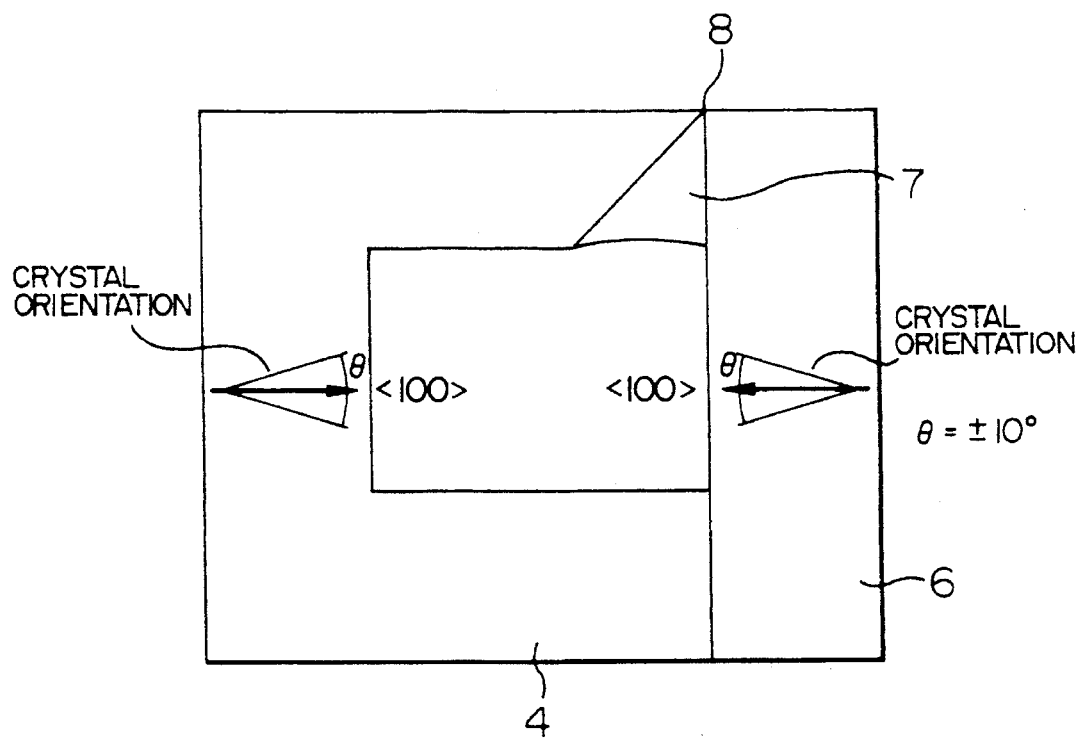
Figure 12E:
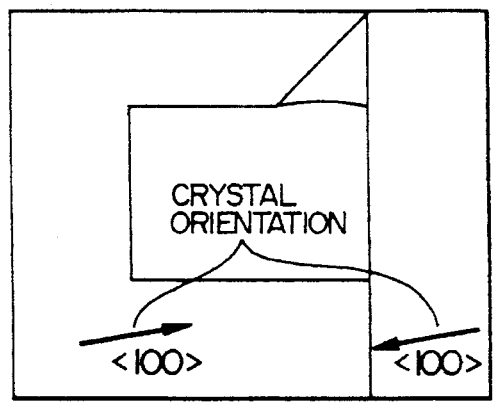
Figure 12F:
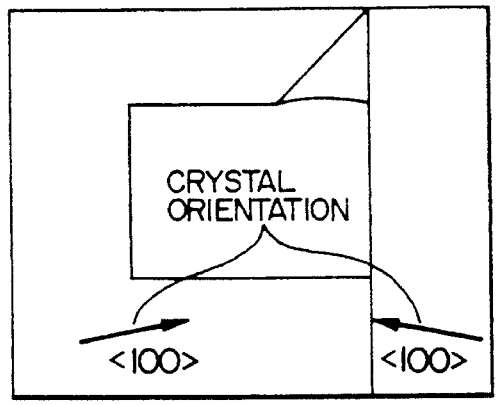

FIGS. 12A to 12F are drawings in a case where the magnetostriction constant of a single crystal magnetic body is $|\lambda_{100}| + 2 \times 10^{-6} \leq |\lambda_{100}|$, when viewed in the direction of the side face. The arrows depicted in these drawings show the crystal orientation of the faces opposing the head gap 8. In the present invention, it is necessity for <111> to be in the range of $\theta = \pm 10°$ when the position of the arrows is taken as the standard. In this case, it is unnecessary for both the I-shaped core and the C-shaped core to be symmetrical, and such dispositions as shown in FIGS. 12b and 12c can be taken. FIG. 12D shows a case of $|\lambda_{111}| \geq |\lambda_{100}| + 2 \times 10^{-5}$, wherein it is necessity for <100> to be in the range of $\theta = \pm 10°$ similarly to the case of FIG. 12A. In this case, as shown in FIGS. 12E and 12F, it is also unnecessary for the crystal orientations to be symmetrical.

Figure 13A:
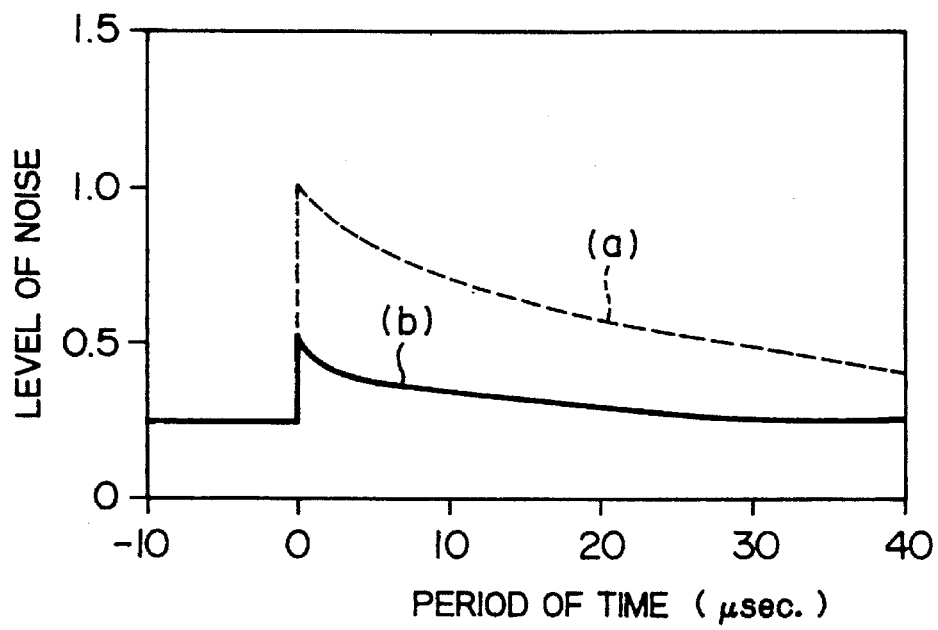
FIGS. 13A, 13B and 13C are graphs showing noise level, crystal orientation of a comparison core, and crystal orientation of the magnetic core used in the present invention, respectively.
Figure 13B:
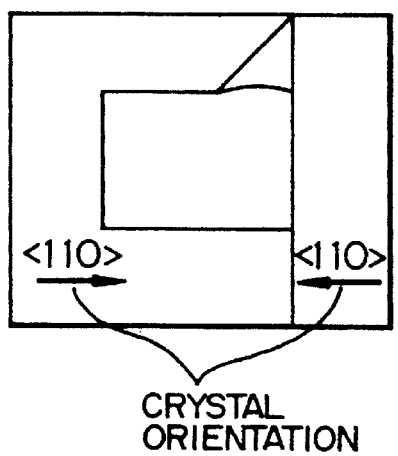
Figure 13C:
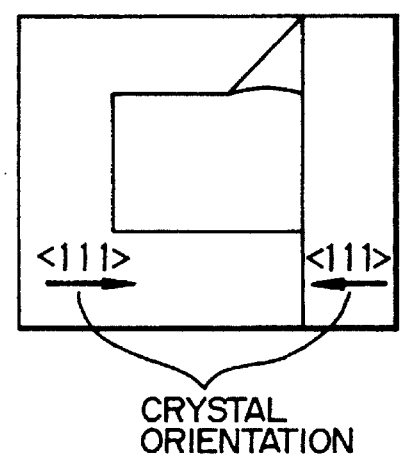

FIG. 13A is a graph showing two cases of the vibration noise of the magnetic heads in each of which an oxide magnetic body constituting the magnetic core is monocrystal MnZn ferrite, in the case (a) shown in FIG. 13B the crystal orientation of the core in the direction of the travel of a magnetic medium being set to be <110>, in the case (b) shown in FIG. 13C the crystal orientation of the core in the direction of the travel of a magnetic medium being set to be <111>, and the case (b) belongs to the scope of the present invention in view of the range of the magnetostriction constant value of the monocrystal ferrite. In FIG. 13A, the maximum noise value of the magnetic head having the magnetic core of the case (a) shown in FIG. 13B is set to be 1, the axis of abscissas being a period of time (micro second) in which recording current is applied till 0 and in which regeneration is effected from 0. As shown in the result of FIG. 13A, the amplitude of noise is large in the magnetic head in which the crystal orientation is not optimized, while in the magnetic head of the present invention optimizing the crystal orientation the level of the amplitude of noise is small with the vibration being attenuated promptly.

Figure 10A:
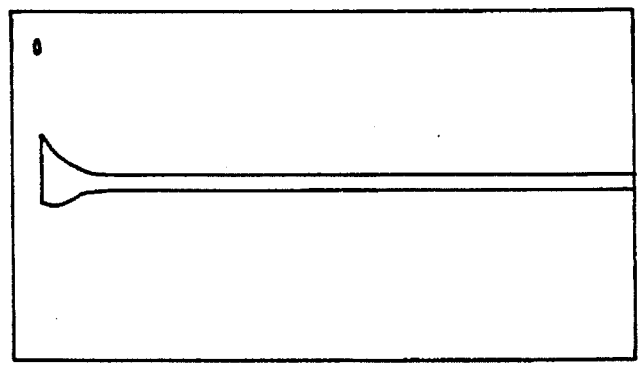
FIGS. 10A and 10B are illustrations showing results of measurement of vibration noises of a monocrystal MnZn ferrite having linear magnetostrictions $\lambda_{111} = 5 \times 10^{-6}$ and $\lambda_{100} = -13 \times 10^{-6}$.
Figure 10B:
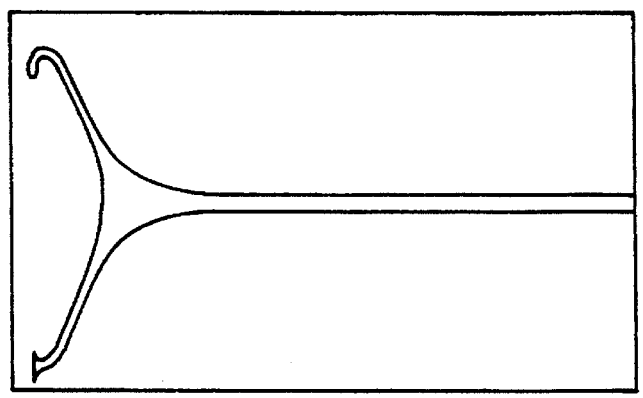
Figure 11A:
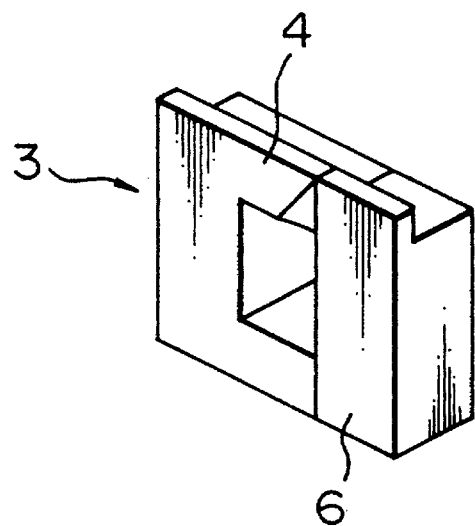
FIGS. 11A and 11B are perspective views of a magnetic core of monocrystal (single crystal) and a slider, respectively.
Figure 11B:
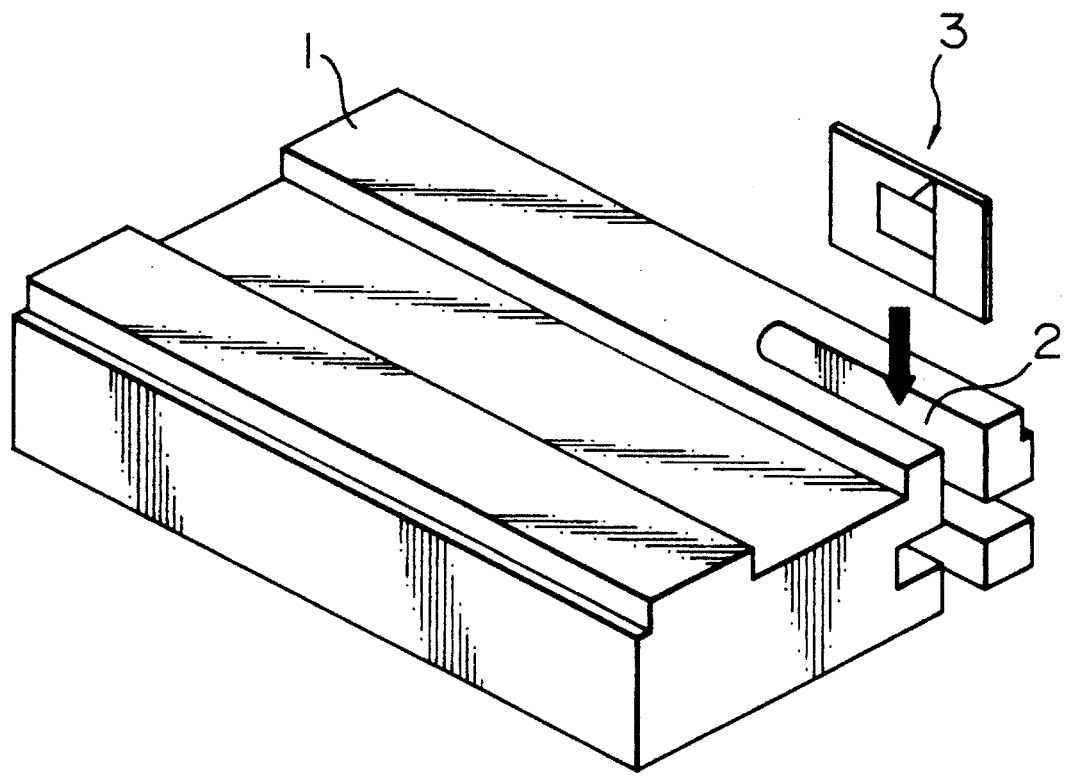

FIG. 10A and 10B shows results of measurement of vibration noises of an electromagnetic transducer element using a monocrystal MnZn ferrite having linear magnetostrictions $\lambda_{111}=7\times10^{-6}$ and $\lambda_{100}=-5\times10^{-6}$. At this measurement, the element was excited for 70 μs by a recording current, and then an output waveform of the element was observed for 100 μs. Numeral 101 indicates the case where the orientation of the element parallel to the direction of travel of a medium is [111], and numeral 102 indicates the case where the orientation is [100]. In this embodiment, with respect to the magnitude of the linear magnetostriction, in the case of $|\lambda_{111}+2\times10^{-6}|\leq|\lambda_{100}|$, a solid angle 3·sinθ·cos φ which satisfies $0\leq\theta<10$ degrees and $0\leq\phi\leq360$ degrees around [111] is satisfied. A comparison between the noise amplitudes of 101 and 102 indicates that the amplitude of 101 is clearly smaller. In the case of $|\lambda_{111}|\geq|\lambda_{100}|+2\times10^{-6}$, the vibration noise can be suppressed to a low level when the solid angle is in the range of sin θ·cosφ, around <100>.

The amplitude of the magnetostriction vibration can be found from the difference between the maximum expansion and the maximum contraction of the crystal due to the magnetostriction. When the symmetry of the crystal is of a cubic system, the expansion/ contraction due to the magnetostriction is defined by the following formula:

$$\delta/L = \tfrac{3}{2}\lambda_{111}(\alpha_1^2\beta_1^2+\alpha_2^2\beta_2^2+\alpha_3^2\beta_3^2) + 3\lambda_{111}(\alpha_2\alpha_3\beta_2\beta_3+\alpha_3\alpha_1\beta_3\beta_1+\alpha_1\alpha_2\beta_1\beta_2)$$

where δ represents the expansion, and L represents the length of the sample. $\alpha_i$ (i=1, 2, 3) represents the direction cosine for the x-axis, y-axis and z-axis of the magnetization direction. $\beta_i$ (i=1, 2, 3) represents the direction cosine for the x-axis, y-axis and z-axis of the direction of observation of the expansion amount. By varying the magnetization direction $\alpha_i$ while fixing the observation direction $\beta_i$, the maximum and minimum values of (δ/L) can be obtained, and the difference between them is the amplitude of the magnetostriction vibration. Based on this result, calculations are made with respect to all $\beta_i$ to obtain variations in amplitude of the magnetostriction due to the crystal orientation.

Figure 4:
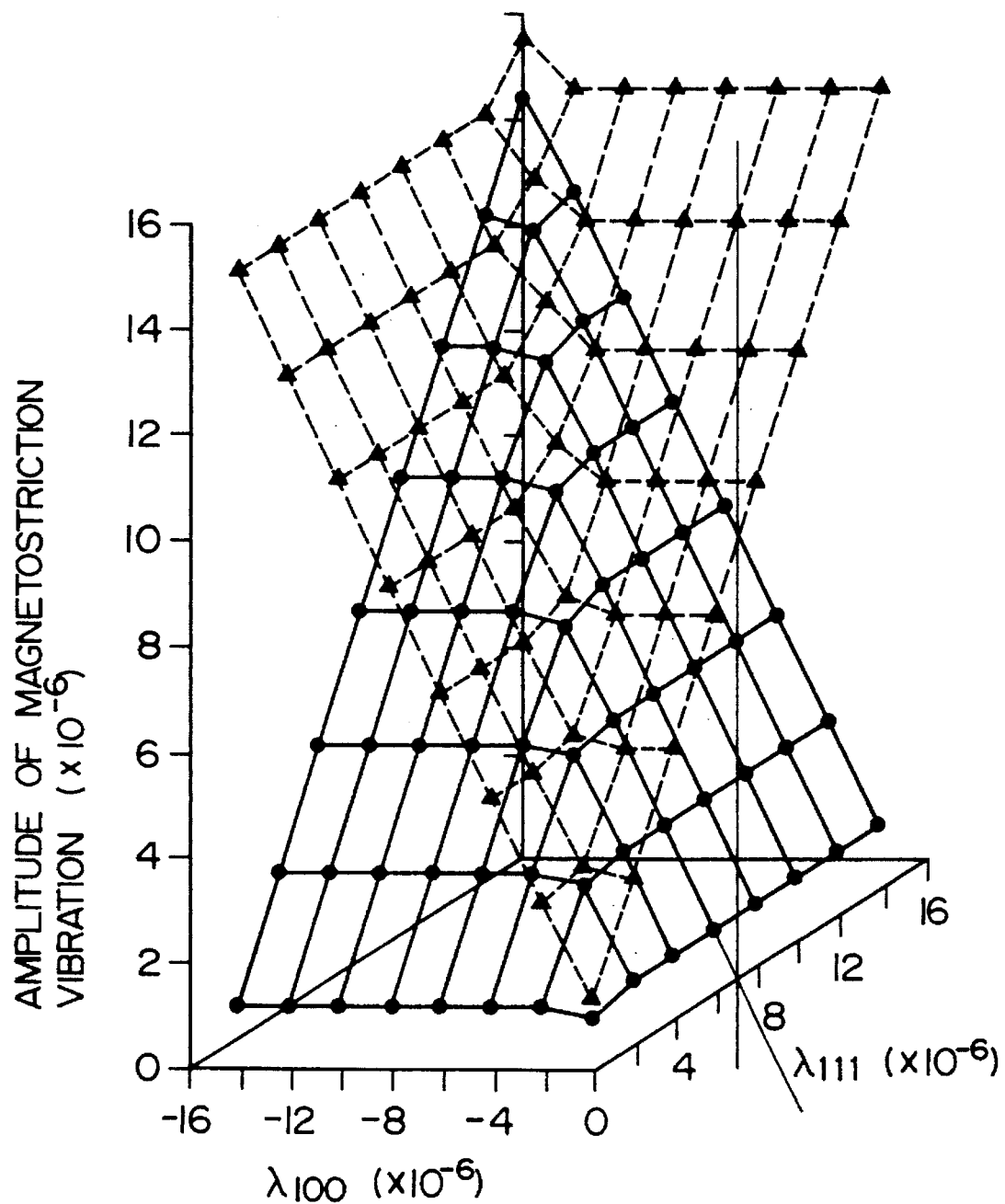
FIG. 4 is a diagram showing variations of amplitudes when changing $\lambda_{111}$ and $\lambda_{100}$.

The dependency of the crystal orientation on the amplitude is calculated to obtain the maximum and minimum values of the amplitude while varying the linear magnetostriction constants $\lambda_{100}$ and $\lambda_{111}$, and this is shown in FIG. 4. Triangular marks denote the maximum values, and circular marks denote the minimum values. The maximum values are arranged like a valley around $|\lambda_{100}|=|\lambda_{111}|$, and the distribution of the minimum values is like a ridge. The difference between the maximum value and the minimum value is small in the region of $|\lambda_{100}|=|\lambda_{111}|$, and tends to increase as the absolute value of the difference between the linear magnetostriction constants becomes larger. The change of the amplitude will now be described, for example, with respect to sections of specific linear magnetostriction values in FIG. 4, that is, $\lambda_{111}=7\times10^{-6}$ and $\lambda_{100}=-7\times10^{-6}$.

Figure 5:
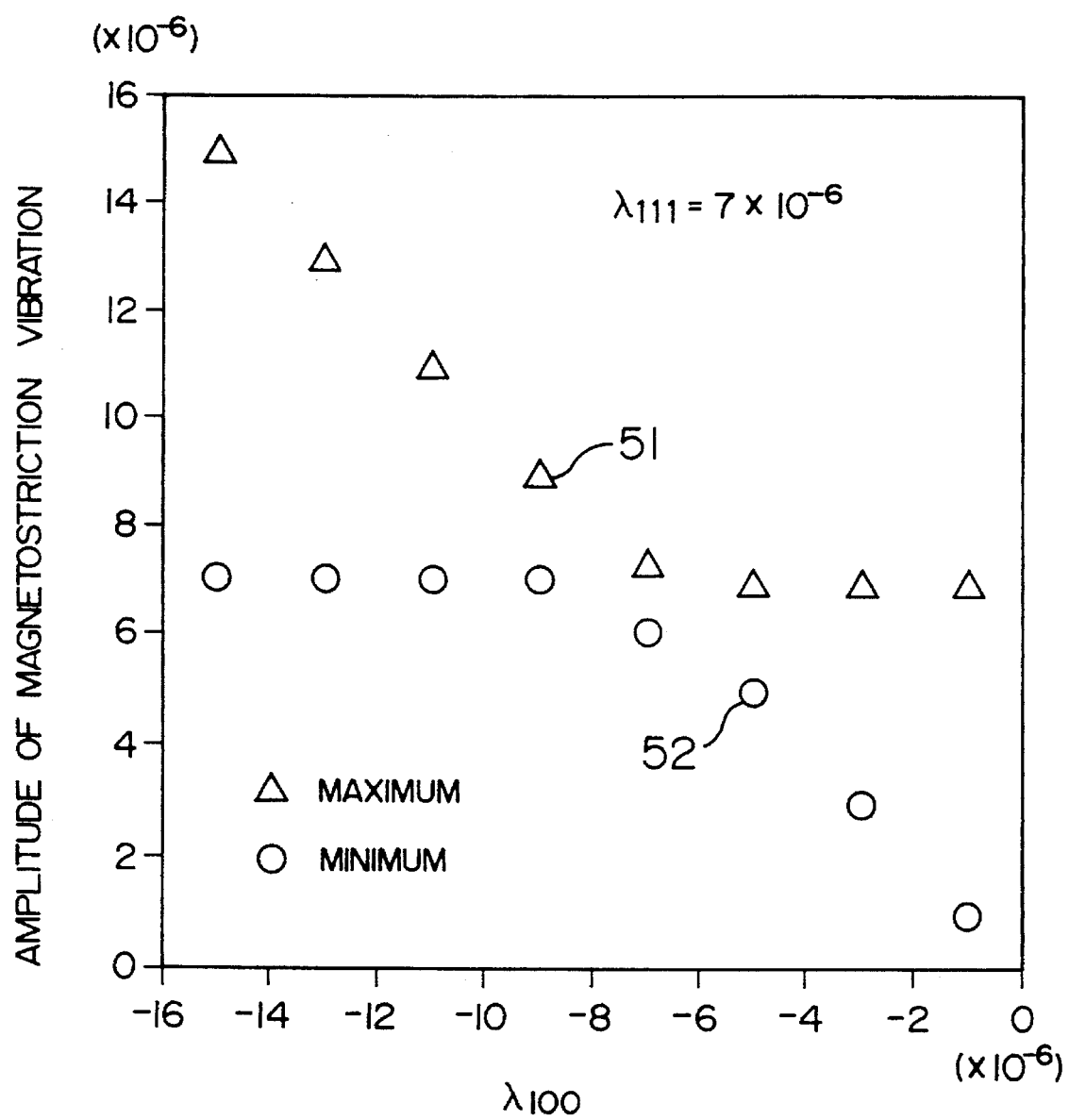
FIG. 5 is a diagram showing variations of amplitudes when changing $\lambda_{100}$ while fixing $\lambda_{111}$.
Figure 6:
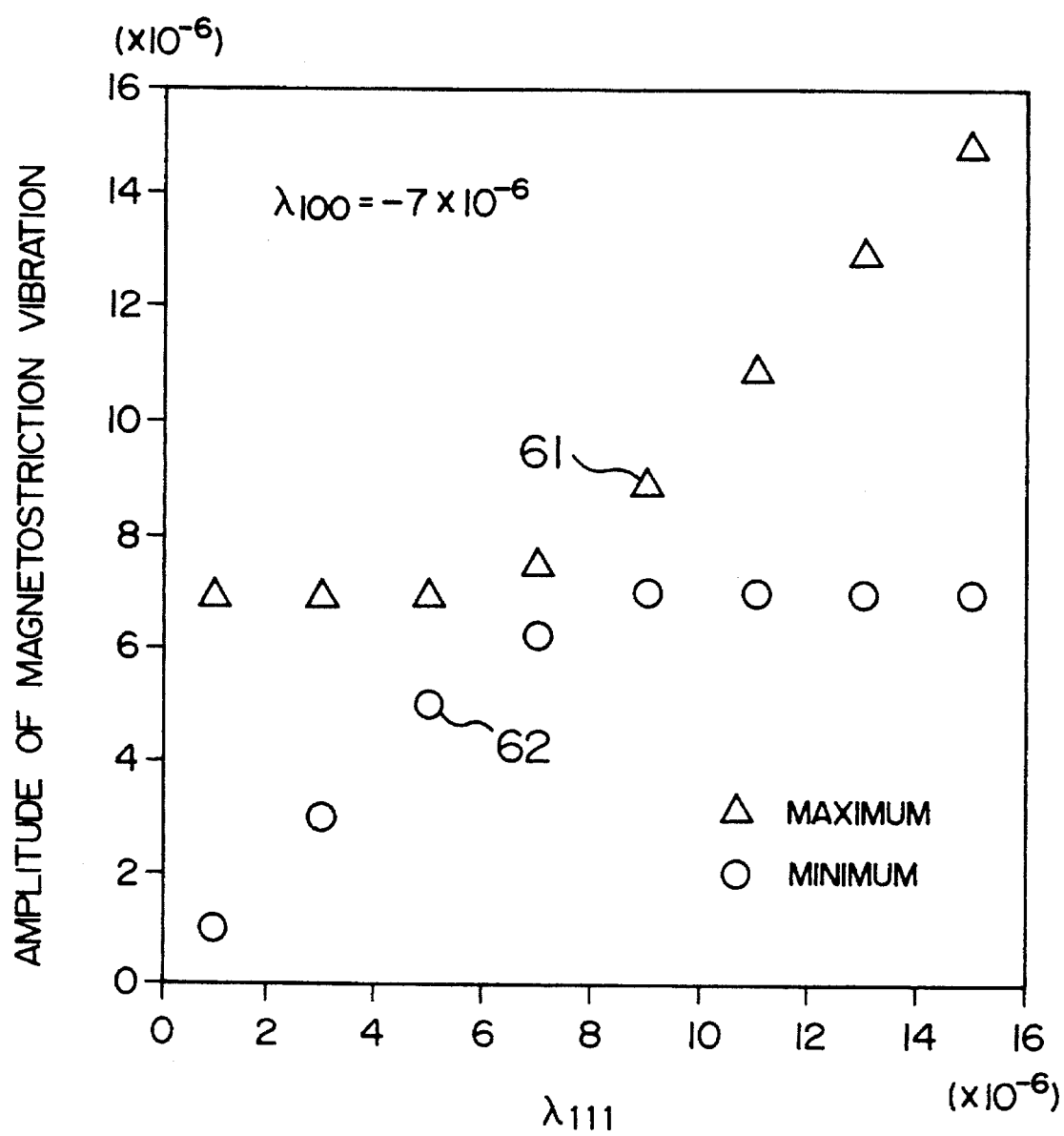
FIG. 6 is a diagram showing variations of amplitudes when changing $\lambda_{111}$ while fixing $\lambda_{100}$.

FIG. 5 shows the maximum and minimum of the amplitude of the magnetostriction vibration of the monocrystal magnetic material calculated in the range of $\lambda_{111}=7\times10^{-6}$ and $-15\times10^{-6}\leq\lambda_{100}\leq-1\times10^{-6}$. A triangular mark designated by 51 represents the maximum value, and a circular mark designated by 52 represents the minimum value. FIG. 6 shows the maximum and minimum of the amplitude calculated in the range of $\lambda_{100}=-7\times10^{-6}$ and $1\times10^{-6}\leq\lambda_{111}\leq15\times10^{-6}$. The maximum value and the minimum value are respectively the values obtained when the amplitude in the direction of the observation becomes the maximum and the minimum when changing the orientation of the monocrystal material.

In the case of FIG. 5, the minimum value is a constant value of $7\times10^{-6}$ when $\lambda_{100}\leq-9\times10^{-6}$ is provided, and the maximum value is a constant value of $7\times10^{-6}$ when $\lambda_{100}\geq-5\times10^{-6}$ is provided. In the case of FIG. 6, the maximum value is a constant value of $7\times10^{-6}$ when $\lambda_{111}\leq5\times10^{-6}$ is provided, and the minimum value is a constant value of $7\times10^{-6}$ when $\lambda_{111}\geq9\times10^{-6}$ is provided.

It is thought that the orientation of the minimum amplitude is <111> and <100> since the value of the amplitude coincides with the values of $|\lambda_{111}|$ and $|\lambda_{100}|$.

Therefore, as shown in FIGS. 5 and 6, the amplitude of the magnetostriction vibration becomes small in the direction <100> in the case of $|\lambda_{111}|+2\times10^{-6}\leq|\lambda_{100}|$, and also this amplitude becomes small in the direction <111> in the case of $|\lambda_{111}|\leq|\lambda_{100}|+2\times10^{-6}$. This is not limited to the specific regions ($\lambda_{100}=-7\times10^{-6}$, $\lambda_{111}=7\times10^{-6}$) of the linear magnetostriction constants, but is applied to the other regions of the linear magnetostriction constants $\lambda_{100}$ and $\lambda_{111}$, as shown in FIG. 4.

Figure 7:
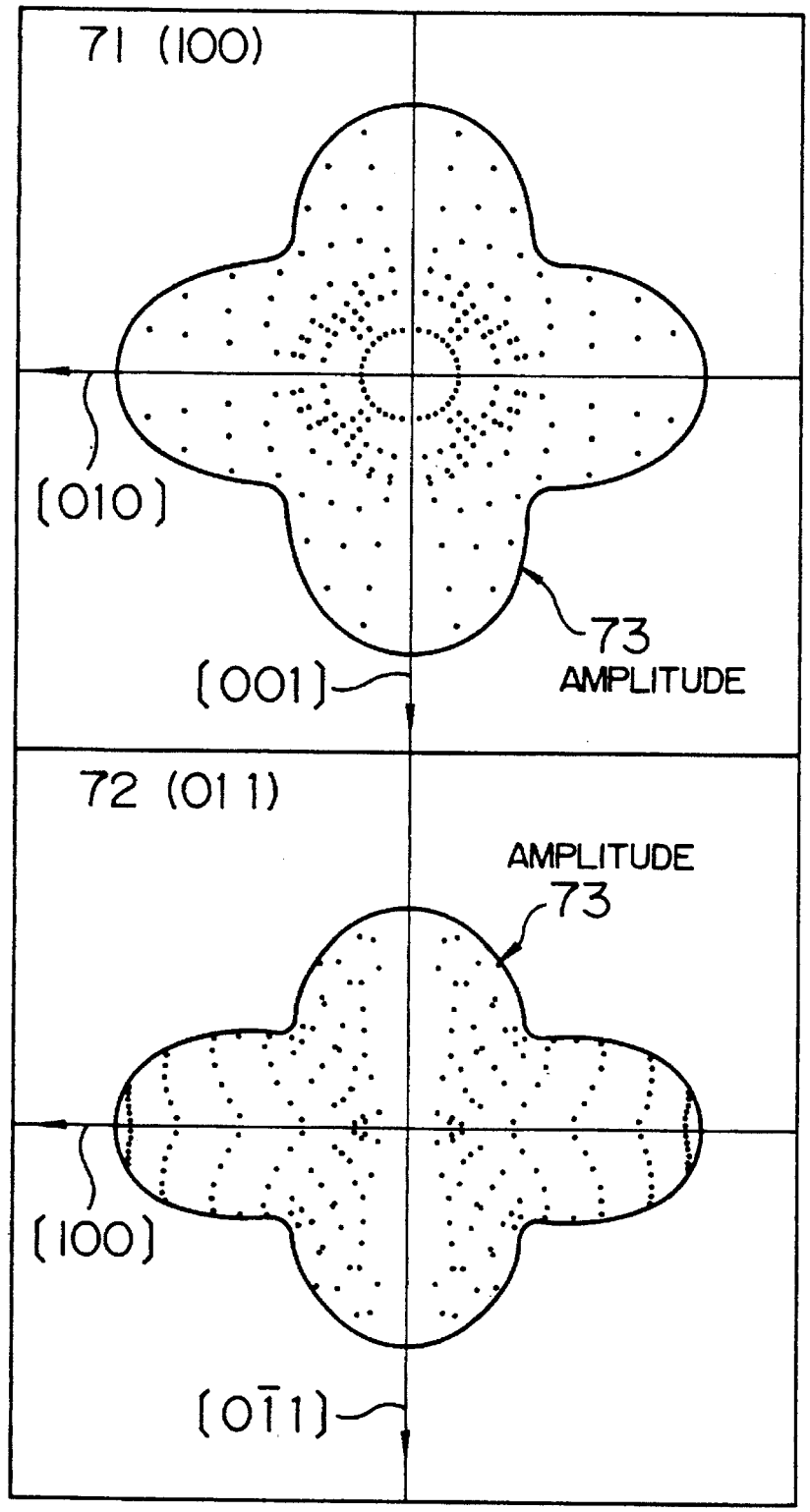
FIG. 7 is a diagram showing the amplitude in the case of $|\lambda_{111}| + 2 \times 10^{-6} \leq |\lambda_{100}|$.

The amplitude of the magnetostriction vibration of the whole of the monocrystal magnetic material due to the crystal orientation is obtained by calculation, and this is shown in FIG. 7. 71 and 72 are provided when the linear magnetostriction constant is $|\lambda_{111}|+2\times10^{-6}\leq|\lambda_{100}|$, and 71 is a projection onto (100), and 72 is a projection onto (011). Each curve 73 represents the amplitude in the plane of observation, and the magnitude is represented in terms of the distance from the origin of the diagram.

Figure 8:
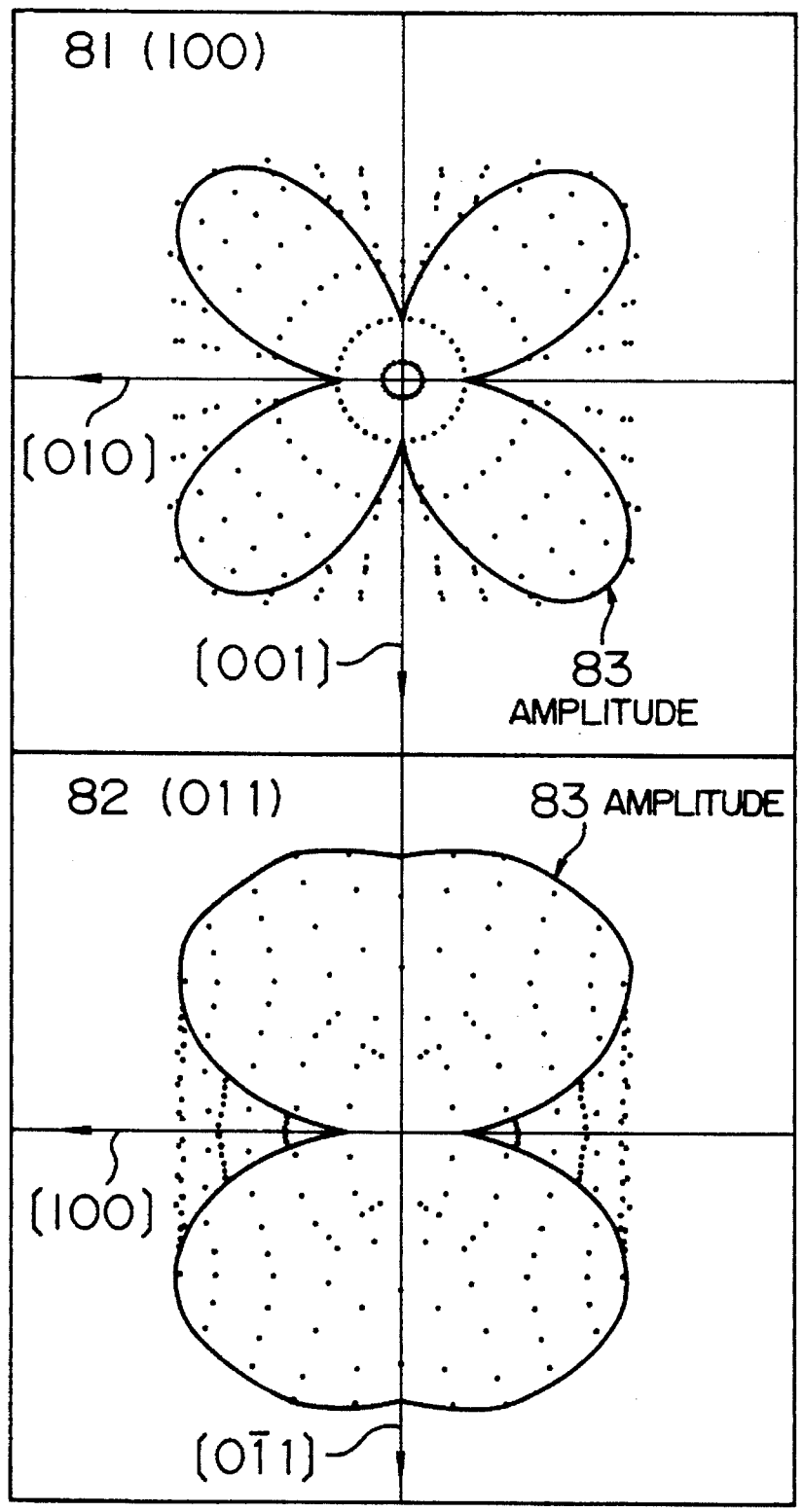
FIG. 8 is a diagram showing the amplitude in the case of $|\lambda_{111}| \geq |\lambda_{100}| + 2 \times 10^{-6}$.

FIG. 8 also shown the amplitude of the magnetostriction vibration due to the crystal orientation which amplitude is obtained by calculation. 81 and 82 are provided when the linear magnetostriction constant is $|\lambda_{111}|\geq2\times10^{-6}+|\lambda_{100}|$, and 81 is a projection onto (100), and 82 is a projection onto (011). Each curve 83 represents the amplitude in the plane of observation, and the magnitude is represented in terms of the distance from the origin of the diagram.

Comparing 71 with 72 in FIG. 7, the amplitude is the maximum in the vicinity of <100>, and is the minimum in the vicinity of <111>. The practically usable range is the range of the solid angle 3·sinθ·cosφ which satisfies $0\leq\theta<10$ degrees and $0\leq\phi\leq360$ degrees around [111].

Comparing 81 with 82 in FIG. 8, the amplitude is the maximum in the vicinity of <111>, and is the minimum in the vicinity of <100>. The practically usable range is the range of the solid angle sinθ·cos·φ which satisfies $0\leq\theta<10$ degrees and $0\leq\phi\leq360$ degrees around [100].

In order to detailedly observe the amplitude distributions as shown in FIGS. 7 and 8, variations in the amplitude as seen in the cross-sections of (100) and (011) are shown.

Figure 9B:
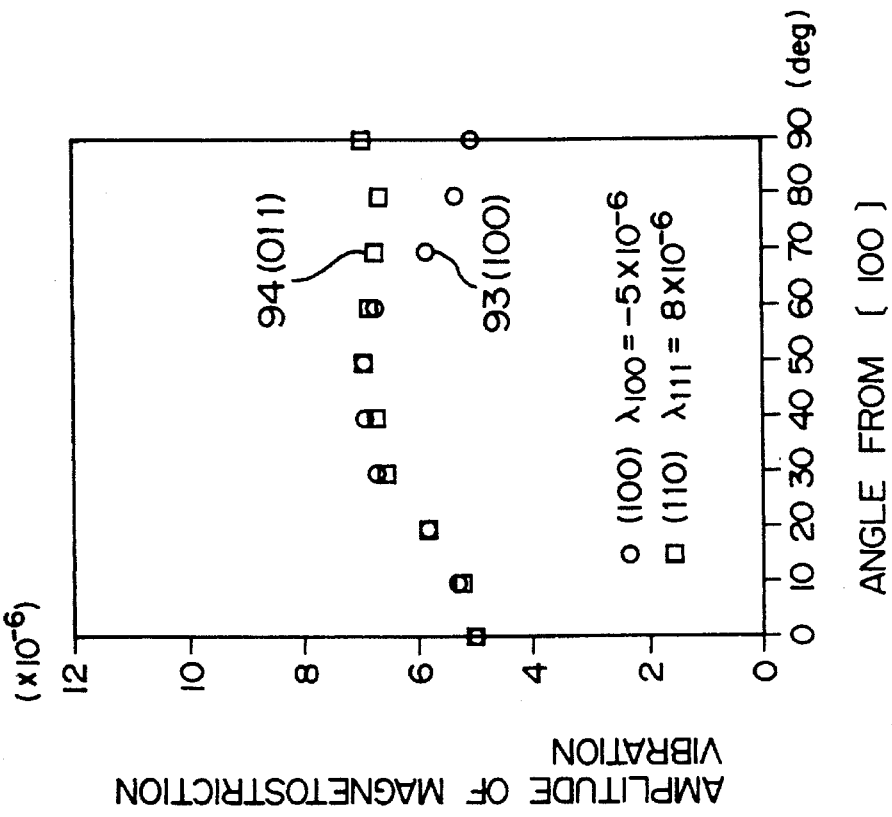
FIGS. 9A and 9B are diagrams showing variations of amplitudes due to the orientation of observation.
Figure 9A:
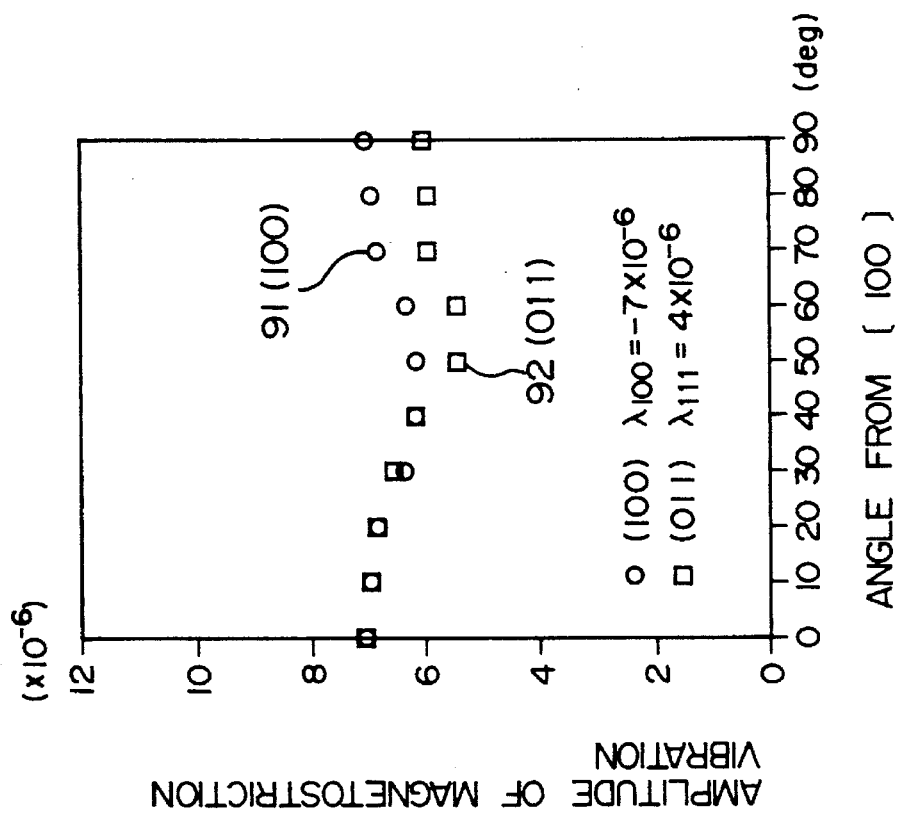

FIGS. 9A and 9B show results of calculation with respect to the amplitude of the magnetostriction vibration due to variations in the linear magnetostriction and variations in the observation orientation. FIG. 9A is obtained in the case of $|\lambda_{111}|+2\times10^{-6}\leq|\lambda_{100}|$, and FIG. 9B is obtained in the case of $|\lambda_{111}|\geq|\lambda_{100}|+2\times10^{-6}$.

In the observation plane of FIG. 9A 91 represents the amplitude in the case of (100), and 92 represents the amplitude in the case of (011). In the observation plane of FIG. 9B, 93 represents the amplitude in the case of (100), and 94 represents the amplitude in the case of (011). The angle in the abscissa axis represents the direction of observation of the magnetostriction vibration, and in the case of (100), this angle covers the range of 90 degrees from [100]

(reference) to [010], and in the case of (011), the angle covers the range of 90 degrees from [100] to [011]. 91 is the minimum in the vicinity of [111], and 92 is the minimum in the vicinity of [111]. 93 is the minimum at [100] and [010], and 94 is the minimum at [100]. Therefore, in the case of FIG. 9A, the minimum amplitude is obtained when the observation orientation is in the vicinity of [111], and in the case of FIG. 9B, the minimum amplitude is exhibited when the observation orientation is in the vicinity of [100].

When observing the vicinity of each minimum value, in the range of ±10 degrees for the angle giving the minimum value, the difference between the minimum value of the amplitude and the value in that range is less than $1\times10^{-6}$.

Generally, with respect to the magnetostriction phenomenon, the amount of not less than $1\times10^{-6}$ poses a problem, and the amount on the order of $10^{-7}$ is considered as being so small as to be negligible. The magnetostriction energy on the order of not less than $10^{-6}$ is equivalent in value to a value of magnetic anisotropic energy of a soft magnetic material, and the value of less than $1\times10^{-6}$ is sufficiently small. And besides, since the vibration energy is proportional to the square of the amplitude, the magnetostriction vibration energy change of less than $1\times10^{-6}$ is on the order of 1% relative to the overall energy, and is negligible. Therefore, in the range of the angle defined in the present invention, the magnetostriction vibrations occur in the same manner.

To summarize the results of FIGS. 4 to 10B, it will be appreciated that the selecting the crystal orientation in which the relative magnitude between the absolute values of the linear magnetostriction constants $\lambda_{111}$ and $\lambda_{100}$ is in the predetermined range, the amplitude of the magnetostriction vibration can be reduced. In view of these results, the orientation which minimizes the amplitude of the magnetostriction vibration is set to be parallel to the direction of travel of the medium, and by doing so, the noise due to the vibration of the element can be reduced to the minimum.

Therefore, to obtain the high-performance floating magnetic head free from the vibration noises, it is not necessary to select the orientation of the magnetostriction constant closest to $\lambda_{111}=\lambda_{100}=0$ which is not always most preferred, and the monocrystal magnetic material may be selected among those falling within the range of the solid angle defined by the present invention.

By utilizing the relation between the linear magnetostriction and the crystal orientation of the monocrystal material constituting the electromagnetic transducer element according to the present invention, the orientation which reduces the magnetostriction vibration of the electromagnetic transducer element can be selected. The use of this element makes it possible to reduce the vibration noises adversely affecting the floating magnetic head.

What is claimed is:

1. A floating magnetic head including an electromagnetic transducer element for reading or writing magnetic information to or from a magnetic medium which travels in a given direction past the magnetic head, said transducer element having a monocrystalline structure made of a MnZn ferrite material, said monocrystalline MnZn ferrite transducer element being positioned on the head with a crystal orientation such that (a) the <111> axis of the monocrystalline MnZn ferrite transducer element is inclined at an angle no greater than 10 degrees relative to the direction of travel of the magnetic medium past the magnetic head in a case of $|\lambda_{111}|+2\times10^{-6}\leq|\lambda_{100}|$, and (b) the <100> axis of the monocrystalline MnZn ferrite transducer element is inclined at an angle no greater than 10 degrees relative to the direction of travel of the magnetic medium past the magnetic head in a case of $|\lambda_{11}|\leq|\lambda_{100}|+2\times10^{-6}$, where $\lambda_{111}$ and $\lambda_{100}$ represent linear magnetostriction constants of said monocrystalline MnZn ferrite transducer element in the <111> and <100> directions, respectively.

2. A floating magnetic head according to claim 1, wherein said MnZn ferrite material has a chemical composition represented by $20\leq MnO\leq40$, $ZnO\leq25$, $50\leq Fe_2O_3\leq65$ in terms of mole %.

* * * * *

UNITED STATES PATENT AND TRADEMARK OFFICE
CERTIFICATE OF CORRECTION

Page 1 of 2

PATENT NO. : 5,576,912
DATED : November 19, 1996
INVENTOR(S) : Chiharu MITSUMATA, et al.

It is certified that error appears in the above-indentified patent and that said Letters Patent is hereby corrected as shown below:

Column 3, line 11, delete "$0 \leq \theta \leq 10$" and substitute
--$0 \leq \theta < 10$--;
    line 38, delete "$\|<100>, \|=1$" and substitute
--$\|<100>\|=1$--;
    line 40, delete "$\|<111>\|>=\sqrt{3}$" and substitute
--$\|<111>\|=\sqrt{3}$--;
    line 41, after "sin", insert a space;
    line 49, delete "r" and substitute --r--.

Column 5, line 2, delete "$|\lambda_{111}| \geq |\lambda_{100} + 2 \times 10^{-6}$" and substitute
--$|\lambda_{111}| \geq |\lambda_{100}| + 2 \times 10^{-6}$--;
    line 21, after "$\lambda_{100}$", insert --$|$--;
    line 25, delete "$|\lambda_{111} \geq |\lambda_{100}| + 2 \times 10^{-6}$" and substitute
--$|\lambda_{111}| \geq |\lambda_{100}| + 2 \times 10^{-6}$--.

*Column 6, line 13, delete "perferable" and substitute
--preferable--;
    line 17, delete "$111 \times 10^{-}/°C.$" and substitute
--$111 \times 10^{-7} °C.$--;
    line 37, delete "$|\lambda_{100}| + 2 \times 10^{-6} \leq |\lambda_{100}|$" and substitute
--$|\lambda_{111}| + 2 \times 10^{-6} \leq |\lambda_{100}|$--;
    *line 40, delete "necessity" and substitute
--necessary--;
    *line 46, delete "necessity" and substitute
--necessary--;

UNITED STATES PATENT AND TRADEMARK OFFICE
CERTIFICATE OF CORRECTION

PATENT NO. : 5,576,912
DATED : November 19, 1996
INVENTOR(S) : Chiharu MITSUMATA, et al.

It is certified that error appears in the above-indentified patent and that said Letters Patent is hereby corrected as shown below:

Column 8, line 43, delete "practically usable" and substitute --practically-usable--;
    line 48, delete "practically usable" and substitute --practically-usable--;
    lines 59-60, delete paragraph indentation;
    line 60, after "9A", insert --,--.

Column 10, line 29, delete "$|\lambda_{11}| \leq |\lambda_{100}| + 2 \times 10^{-6}$" and substitute --$|\lambda_{111}| \geq |\lambda_{100}| + 2 \times 10^{-6}$--.

Signed and Sealed this

Eighth Day of April, 1997

*Attest:*

BRUCE LEHMAN

*Attesting Officer*     *Commissioner of Patents and Trademarks*